United States Patent [19]
Choy et al.

[11] Patent Number: 5,487,120
[45] Date of Patent: Jan. 23, 1996

[54] OPTICAL WAVELENGTH DIVISION MULTIPLEXER FOR HIGH SPEED, PROTOCOL-INDEPENDENT SERIAL DATA SOURCES

[75] Inventors: Michael M. Choy, Hsinchu, Taiwan; Paul E. Green, Jr., Mt. Kisco, N.Y.; William E. Hall, Clinton; Frank J. Janniello, Stamford, both of Conn.; Jeff K. Kravitz, Yorktown Heights, N.Y.; Karen Liu, Montclair, N.J.; Rajiv Ramaswami, Ossining, N.Y.; Franklin F. Tong, Stamford, Conn.

[73] Assignee: International Business Machines Corporation, Armonk, N.Y.

[21] Appl. No.: 193,969

[22] Filed: Feb. 9, 1994

[51] Int. Cl.[6] .................... G02B 6/00; G02B 6/36
[52] U.S. Cl. ...................................... 385/24; 359/152
[58] Field of Search .................... 385/24, 3, 14, 385/9, 40, 41, 45; 359/152, 173, 154, 163, 179, 188, 195

[56] References Cited

U.S. PATENT DOCUMENTS

| | | | |
|---|---|---|---|
| 4,343,532 | 8/1982 | Palmer | 350/96.16 |
| 4,430,700 | 2/1984 | Chadima, Jr. et al. | 364/200 |
| 4,673,270 | 6/1987 | Gordon | 350/96.29 |
| 4,792,999 | 12/1988 | Stilwell, Jr. | 455/619 |
| 4,824,193 | 4/1989 | Maeda et al. | 350/96.19 |
| 4,824,200 | 4/1989 | Isno et al. | 385/24 |
| 4,941,208 | 7/1990 | Olshansky et al. | 455/618 |
| 5,040,169 | 8/1991 | Guerin et al. | 359/124 |
| 5,064,263 | 11/1991 | Stein | 385/24 |
| 5,074,634 | 12/1991 | Takahashi | 385/24 X |
| 5,157,530 | 10/1992 | Loeb et al. | 359/124 |
| 5,224,183 | 6/1993 | Dugan | 385/24 |
| 5,226,100 | 7/1993 | Maerz | 385/24 X |
| 5,347,601 | 9/1994 | Ade et al. | 38/24 X |
| 5,392,377 | 2/1995 | Auracher | 385/24 |

FOREIGN PATENT DOCUMENTS

0279932A1  8/1988  European Pat. Off.

*Primary Examiner*—Akm E. Ullah
*Attorney, Agent, or Firm*—Perman & Green

[57] ABSTRACT

A wavelength division multiplexer (WDM) unit (12) includes a plurality of Input/Output cards (IOCs 14). Each IOC is bidirectionally coupled to I/O specific media (fiber or copper) and to two coaxial cables. Also bidirectionally coupled to the coaxial cables are a plurality of Laser/Receiver Cards (LRC 20). The interface between the IOCs and the LRCs is an Emitter Coupled Logic (ECL) electrical interface that is conveyed over the coaxial cables. Each LRC is bidirectionally coupled by two single mode fibers to an optical multiplexer and demultiplexer, embodied within a grating (24). An input/output port of the grating is coupled to a fiber link (28) that enables bidirectional, full duplex data communications with a second WDM. Each WDM also includes a Diagnostic Processor Card (DPC 28) that receives status signals from the IOCs and LRCs, that forwards the status signals on to an external processor, and which generates control information for the IOCs and LRCs.

12 Claims, 7 Drawing Sheets

OPTICAL WAVELENGTH DIVISION MULTIPLEXER FOR HIGH SPEED, PROTOCOL-INDEPENDENT SERIAL DATA SOURCES

FIELD OF THE INVENTION

This invention relates generally to data communications and, in particular, to data communications apparatus and methods that employ an optical wavelength division multiplexer (WDM).

BACKGROUND OF THE INVENTION

Optical wavelength division multiplexing is a known technique for combining a plurality of optical signals having different wavelengths and inserting the wavelengths into a single optical fiber. The multiple wavelength signal is transmitted through the fiber to a receiving end where the wavelengths are separated and demultiplexed accordingly. Typically, the wavelengths are multiplexed and demultiplexed by the use of diffraction gratings or thin film interference filters. These devices provide a spectral selectivity that is predetermined in accordance with the wavelengths in use.

One advantage that results from the use of wavelength division multiplexing is that a single optical fiber can simultaneously carry a plurality of data signals in two directions.

The following commonly assigned U.S. patents are all directed to optical and/or WDM communication techniques: U.S. Pat. No. 4,792,999, entitled "Wavelength Agile Optical Receiver" (Stilwell, Jr.); U.S. Pat. No. 5,040,169, entitled "Wavelength Division Photonic Switch" (Guerin et al.); and U.S. Pat. No. 5,157,530, entitled "Optical Fiber System" (Loeb et al.). Also of interest is commonly assigned European patent application A 0 279 932, entitled "Optical Communication Signal Source" (Block et al.).

Other patents of interest include the following: U.S. Pat. No. 4,343,532, entitled "Dual Directional Wavelength Demultiplexer" (Palmer); U.S. Pat. No. 4,430,700, entitled "System and Method For Communication Between Nodes of a Closed Loop Local Communication Path" (Chadima, Jr. et al.); U.S. Pat. No. 4,673,270, entitled "Channel Add/Drop Filter-Coupler" (Gordon); U.S. Pat. No. 4,824,193, entitled "Holographic Multiplexer/Demultiplexer and Its Manufacturing Method" (Maeda et al.); U.S. Pat. No. 4,941,208, entitled "High Performance Subcarrier Multiplexed Optical Communication System With Modulation Index Exceeding Unity" (Olshansky et al.); and U.S. Pat. No. 5,064,263, entitled "Multiplexing Apparatus For The Direct Optical Reception of a Plurality of Optical Wavelengths" (Stein).

A problem arises in the use of conventional multiplexing equipment when it is desired to send and receive multiple high-speed full-duplex data streams of different types. That is, a user may have one type of equipment that generates a data stream at a first bit rate and with a first communications protocol and a second type of equipment that generates a second bit stream with a second bit rate and a second communications protocol that differs from the first protocol. Typically, the user would be required to rent, at considerable cost, a pair of fiberoptic conductors from a fiber provider for each of the full-duplex data streams. As the number of different types of data communications equipment increases, it can be appreciated that the expense associated with renting additional fiber pairs may become prohibitive.

SUMMARY OF THE INVENTION

The foregoing and other problems are overcome by wavelength division multiplex communications apparatus that is constructed in accordance with the invention, and by a method of operating same. The method includes a first step of receiving a plurality of input signals from a plurality of first data communications devices, at least two of the first data communications devices operating at different bit rates and/or with different protocols. At least two of the data communications devices may also transmit and receive information over a different medium, such as copper wire and optical fiber. A second step of the method converts each of the received inputs into an optical signal having a wavelength that differs from other wavelengths of others of the converted received inputs. A third step wavelength division multiplexes the optical signals and transmits a resulting wavelength division multiplexed signal over an optical conductor to a remote site.

At the remote site the wavelength division multiplexed signal is received and demultiplexed into a plurality of received optical signals. Each of the received optical signals is converted into a corresponding electrical signal. A next step provides a plurality of outputs to a plurality of second data communications devices, at least two of the second data communications devices operating at different bit rates and with different protocols that correspond to the bit rates and protocols of the at least two of the first data communications devices.

More particularly, this invention provides a wavelength division multiplexer (WDM) unit that includes a plurality of Input/Output cards (IOCs). Each IOC is bidirectionally coupled to I/O specific media (fiber or copper) and to two coaxial cables. Also bidirectionally coupled to the coaxial cables are a plurality of Laser/Receiver Cards (LRC). The interface between the IOCs and the LRCs is an Emitter Coupled Logic (ECL) electrical interface that is conveyed over the coaxial cables. Each LRC is bidirectionally coupled by two single mode fibers to an optical multiplexer and demultiplexer, embodied within a grating. An input/output port of the grating is coupled to a fiber link that enables bidirectional, full duplex data communications with a second WDM at a distance of up to approximately 75 kilometers. Each WDM also includes a Diagnostic Processor Card that receives status signals from the IOCs and LRCs, that forwards the status signals on to an external processor, and which generates control and timing information for the IOCs and LRCs.

Each IOC is associated with one of a plurality of communications channels and includes an I/O specific media connector that is coupled to an appropriate transmitter (Tx) and receiver (Rx). The I/O specific media connector, Tx and Rx are constructed and operated in accordance with the specific data stream type that is input to and output from the associated channel of the WDM. By example, a first data stream may be conveyed through an optical (fiber) conductor in accordance with an ESCON protocol at 200 Mb/s, and a second data stream may be conveyed through an electrical (copper) conductor in accordance with a non-specific protocol at up to 622 Mb/s.

In a presently preferred embodiment of the invention the IOCs and LRCs for a given channel are provided in pairs, one pair being located in each WDM. Each IOC/LRC pair corresponds to two fixed optical wavelengths, one wavelength for each direction of data transfer.

A plurality of diagnostic status signals include a Port Status signal that is generated by the IOC, and three status signals that are generated by the LRC, specifically a Laser Status signal, a Laser Control Status signal, and a Received Data Status signal. The DPC provides an enabling Pulse input to each LRC, and also a CLK signal. The CLK signal is employed with the Port Status signal to place the laser transmitter into a known transmitting state upon an occurrence of a loss of the input data signal to the channel from the attached optical or electrical network.

An ability to select a particular IOC for different serial data stream protocols and to add, remove, and to change the IOCs at will is an important feature of the invention. The process of adding a new channel, or converting an existing channel to use a new serial data stream protocol, involves installing the same type of IOCs into the two WDMs at both ends of the fiber link, and making the appropriate serial data steam connections to the media specific connectors of each of the IOCs.

BRIEF DESCRIPTION OF THE DRAWINGS

The above set forth and other features of the invention are made more apparent in the ensuing Detailed Description of the Invention when read in conjunction with the attached Drawings, wherein:

FIG. 3b shows a portion of the safety circuit that is a component of the LRC of FIG. 3a;

DETAILED DESCRIPTION OF THE INVENTION

Figure 1:
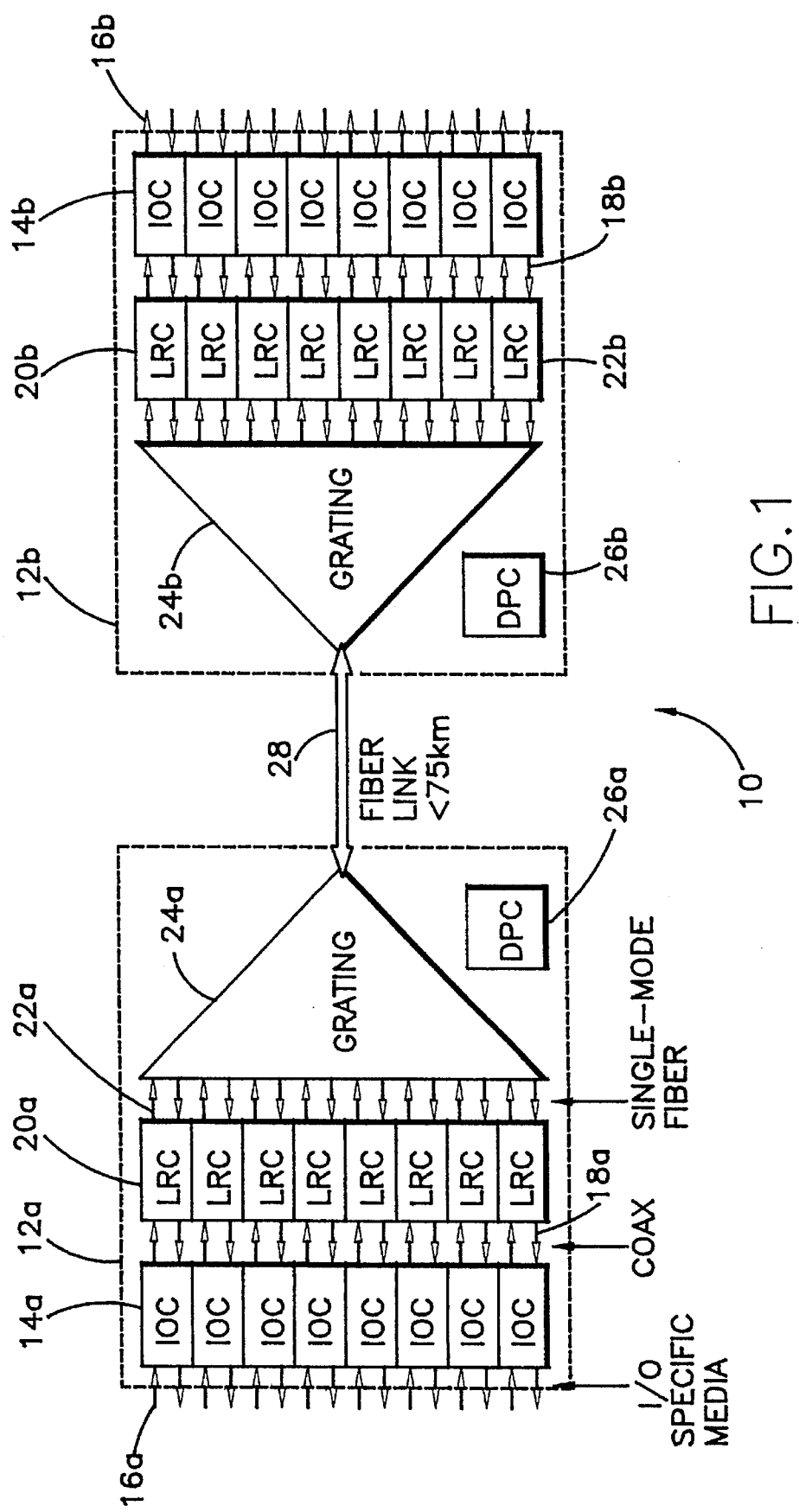
FIG. 1 is a block diagram of an embodiment of an optical WDM that is constructed in accordance with this invention.

FIG. 1 illustrates a data communications system 10 that is constructed and operated in accordance with this invention. System 10 includes at least two spatially separated Wavelength Division Multiplexer (WDM) units 12. As employed herein a first WDM unit is referenced as 12a, and all component parts thereof are designated with a numeral followed by the letter "a". In like manner the second WDM unit is referenced as 12b, and all component parts thereof are designated with a numeral followed by the letter "b". The WDM units 12a and 12b are similarly constructed so as to provide complementary wavelength use (i.e., $\lambda_1$ is transmitted by WDM 12a and received by WDM 12b, while $\lambda_2$ is transmitted by WDM 12b and received by WDM 12a). As such, when referring generally to the WDM units and/or the component parts thereof the "a" and "b" suffixes are omitted after the reference numeral. As will become apparent, each WDM 12 also includes a capability to demultiplex a plurality of received wavelengths.

As employed herein an optical signal is generally intended to encompass wavelengths in the range of approximately 300 nanometers to approximately 2000 nanometers (UV to far IR). This range of wavelengths can be accommodated by the preferred type of optical conductor (a fiber optic), which typically operates in the range of approximately 800 nanometers to approximately 1600 nanometers.

Also as employed herein, a protocol is generally intended to mean an agreement between two peer entities on a format of communication. The protocol typically includes agreement on, by example, the bit rate, modulation format (e.g., AM or FM), coding, and framing (e.g., definition of units of data).

Figure 2:
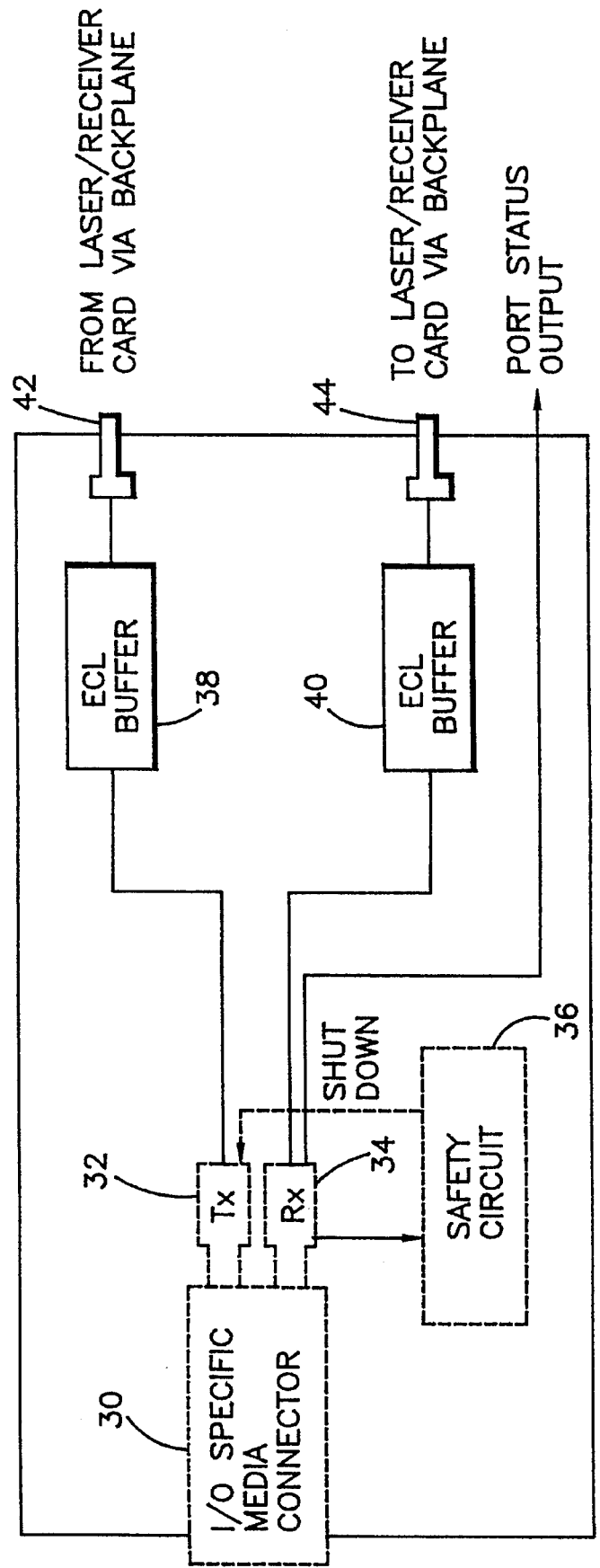
FIG. 2 is a block diagram of an Input/Output (I/O) card (IOC) thwart is a feature of the WDM of FIG. 1.

Each WDM unit 12 includes a plurality of Input/Output cards (IOCs) 14 of a type shown in FIG. 2. Each IOC 14 is bidirectionally coupled to I/O specific media 16 (fiber or copper) and to coaxial cables 18. In that each signal is differential, and is therefore carried by two conductors, a total of four coaxial cables 18 are employed for each IOC 14. Also bidirectionally coupled to the coaxial cables 18 are a plurality of Laser/Receiver Cards (LRC) 20 of a type shown in FIG. 3a. The interface between the IOCs 14 and the LRCs 20 is an Emitter Coupled Logic (ECL) electrical interface that is conveyed over the coaxial cables 18. Each LRC 20 is bidirectionally coupled by two single mode fibers 22 to an optical multiplexer and demultiplexer. In the presently preferred embodiment of the invention the optical multiplexer and demultiplexer is embodied within a commercially available grating 24. An input/output port of the grating 24 is coupled to a fiber link 28 that enables bidirectional multichannel data communications with a second WDM 12 at a distance of up to approximately 75 kilometers. Each WDM 12 also includes a Diagnostic Processor Card 26 that receives status signals from the IOCs 14 and LRCs 20, and which generates control and timing information therefor.

Each IOC 14 is associated with one of a plurality of communications channels (1–8) and includes an I/O specific media connector 30 that is coupled to an appropriate transmitter (Tx) 32 and receiver (Rx) 34. The components 30, 32, and 34 are constructed and operated in accordance with the specific data stream type that is input to and output from the associated channel of the WDM 12.

The WDM 12 is capable of supporting a large variety of serial data stream types. Exemplary optical and non-optical data stream types of particular interest include the following:

ESCON/Tahoe (IBM fiber optic host channel), using 1.3 micron LEDs at 200 Mb/s;

ESCON/ECSL (extended distance), using 1.3 micron laser diodes at 200 Mb/s;

FDDI (Fiber Digital Data Interface) at 125 Mb/s;

CDDI (electrical conductor-based variant of FDDI) at 125 Mb/s;

FCS (Fibre Channel Standard);

T1 (1.5 Mb/s) or T3 (45 Mb/s);

Serial or parallel HIPPI (1.25 Gb/s); and

General Purpose (TTL, CMOS, ECL) interface (up to 622 Mb/s).

The exemplary communication types listed above may be used in any combination within the WDM 12. That is, each channel is independent of every other channel and provides a capability to perform full duplex communications, utilizing as a minimum the single fiber link 28, between the WDM 12a and a remotely located WDM 12b. The WDM's 12a and 12b are configured such that corresponding channels employ the same type of I/O specific components 30, 32 and 34.

The provision of the General Purpose interface provides an open (protocol independent) capability and can be used, by example, to support the transmission of compressed or uncompressed television signals at a selected bit-rate. Also by example, the output of an analog to digital converter can be transmitted. In this regard the General Purpose interface may include a parallel to serial converter at the transmitting end, and a complementary serial to parallel converter at the receiving end. The use of appropriate parallel to serial and serial to parallel converters is also employed when interfacing to a parallel HIPPI channel. The transmission of light modulated in accordance with analog signals can also be supported.

By example only, channel 1 in WDM 12a may be bidirectionally coupled to a bit-serial HIPPI channel (via HIPPI-specific media 16a), and channel 1 in WDM 12b is thus also bidirectionally coupled to a bit-serial HIPPI channel (via HIPPI-specific media 16b). Also by example, channel 2 in WDM 12a may be bidirectionally coupled to a bit-serial FDDI optical channel (via FDDI-specific media 16a), and channel 2 in WDM 12b is thus also bidirectionally coupled to a bit-serial FDDI optical channel (via FDDI-specific media 16b). For these two cases it can clearly be seen that the bit rates between channels 1 and 2 differ significantly, as do the underlying data communication protocols and the nature of transmission over the associated networks (electrical signals vs. optical signals). However, the WDMs 12a and 12b enable both bit-serial data streams, in combination with up to six other communication protocols and/or bit rates, to be transmitted and received through the single fiber link 28.

The 622 Mb/s maximum bit rate is not a fundamental limitation of the invention, but instead is a maximum data rate that can be supported by the electronics of the current implementation of the WDM 12.

The RX 34 generates a Port Status output to indicate the integrity of the I/O specific media connection. For example, for an optical channel the Port Status output indicates that the Rx 34 is receiving light from the input fiber via the I/O media specific connector 30.

If the Tx 32 is a laser the IOC 14 may further include a safety circuit 36.

The IOC 14 also includes an ECL input buffer 38 and an ECL output buffer 40. Buffers 38 and 40 are each terminated with a suitable connector 42 and 44, respectively, for interfacing, via the coaxial cables 18, to the associated LRC 20.

Figure 3A:
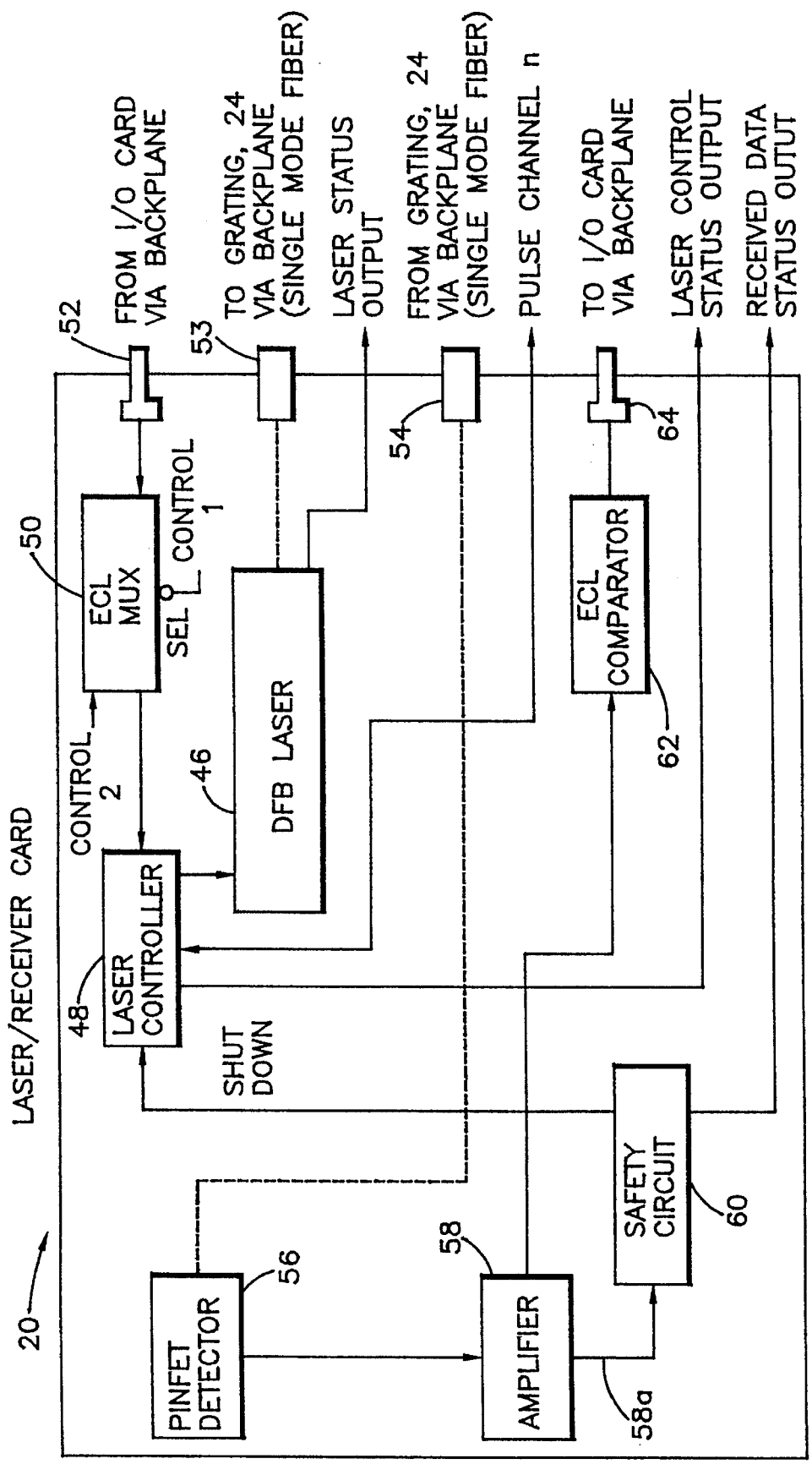
FIG. 3a is a block diagram of a Laser/Receiver (L/R) card (LRC) that is a feature of the WDM of FIG. 1.

FIG. 3a illustrates the construction of one LRC 20. Each LRC 20 includes, preferably, a distributed feedback (DFB) semiconductor diode laser 46 that generates an optical signal at a predetermined wavelength for application, via a single mode fiber 22, to the grating 24. The DFB laser 46 is preferably operated in the 1.5 micron band wherein attenuation is only 0.2 to 0.3 dB per kilometer. The wavelength spacing between the DFB lasers 46 of each of the LRCs 20 is nominally one nanometer. This wavelength spacing allows the multiplexing and demultiplexing by the grating 24 of a number of optical signals according to wavelength. Due to the nature of the grating 24, and optical transmission in general, there is essentially no interaction between the optical signals of different wavelengths. This enables the sharing of the common fiber link 28 by signals originating from and destined to a plurality of different types of communications equipment. In addition, the optical grating 24 is a bidirectional device enabling the fiber link 28 to support multi-channel, full duplex data traffic.

The DFB laser 46 provides a Laser Status Output from an internal photodetector that is positioned to detect the optical radiation generated by the DFB laser diode. The Laser Status Output is indicative of the DFB laser integrity.

The DFB laser 46 is controlled by a laser controller 48 which receives an input, via an ECL MUX 50 and connector 52, from the ECL output buffer 40 of the associated IOC 14. This input represents the signal received from the I/O specific media components 30 and 34. The laser controller 48 operates the DFB laser 46 in accordance with the received ECL signal to generate a modulated optical signal for application, via connector 53 and single mode fiber 22, to the grating 24 for transmission via the fiber link 28.

The laser controller 48 generates a Laser Control Status Output which indicates the state of a laser control signal line that is used to operate the DFB laser 46. The magnitude of this control signal line is varied by the controller 48 to achieve a desired power output from the DFB laser 46. As such, the control signal line is also indicative of the integrity of the DFB laser 46.

The LRC 20 receives, via connector 54, a demultiplexed optical signal from the grating 24. This optical signal is applied to a suitable optical detector 56, such as an avalanche detector or a PINFET detector, which converts the optical signal into an electrical signal. The electrical signal that is output from the detector 56 is further amplified by amplifier 58 and is applied to an LRC safety circuit 60 and, via ECL comparator 62 and connector 64, to the ECL input buffer 38 of the associated IOC 14. The input signal at the IOC 14 is applied to the media specific transmitter 32 and connector 30 for application to the attached communications link.

The laser controller 48 is also responsive to a Pulse Signal Line to periodically activate the DFB laser 46. The Pulse Signal line is generated by the DPC 26 as will be described below.

Figure 4:
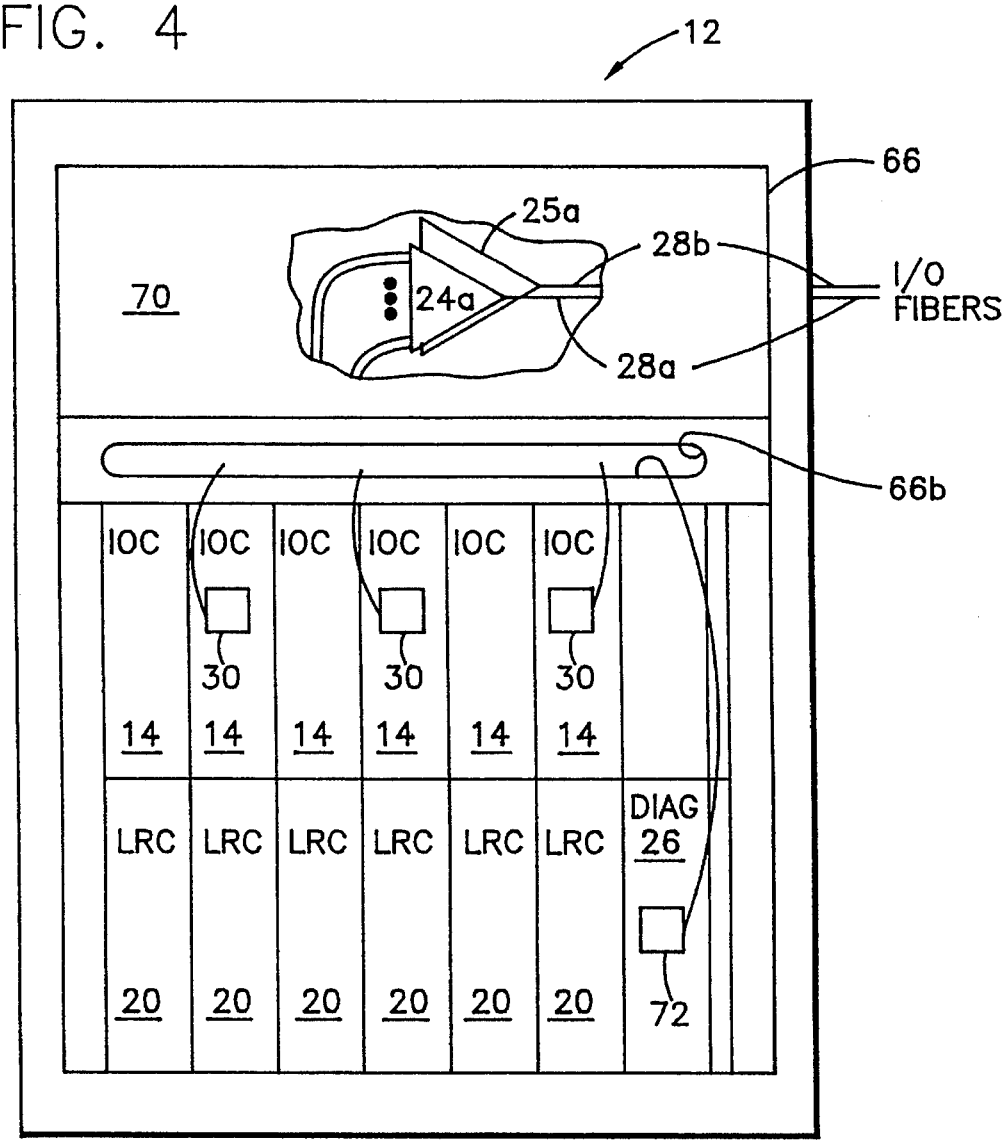
FIG. 4 is a simplified front view of the WDM of FIG. 1, showing the placement of the I/O and L/R cards of FIGS. 2 and 3a, respectively.

FIG. 4 illustrates the packaging of the WDM 12. A standard 19 inch rack-mountable "subrack" enclosure 66 contains two rows of cards and at the top an area 70 (shown partially cut-away) which houses the optical grating 24a, or gratings 24a and 25a as described below in reference to FIG. 6. Each grating has attached thereto 17 fiber pigtails. An I/O Fiber Connector on the front panel is provided for attachment to at least one input/output optical fiber 28a. A connector 72 is also provided for interfacing the DPC 26 to an external data processor. As an example, the connector 72 provides a standard RS-232C compatible communications link. A slot 66a is provided for channeling the various front panel cables into the enclosure 66. In FIG. 4 only six pairs of IOC/LRC cards are shown installed, it being realized that this number is exemplary only.

In a presently preferred embodiment of the invention the WDM 12 is configured as two rows of up to eight pluggable modules on the front panel, the lower row containing the LRCs 20 and the upper row containing the IOCs 14. The two rows are divided into eight columns, where each column represents a multiplexed full duplex channel. Each full duplex channel corresponds to two fixed optical wavelengths, one wavelength for each direction of data transfer. The channels are numbered or otherwise identified, as the position of the column is related to the optical wavelength that is connected to the optical grating 24 for that column.

The pluggable modules are keyed so that an IOC 14 can only be plugged into a slot in the upper row and a LRC 20 can only be plugged into a slot in the lower row. The keying is further extended such that a LRC 20 whose DFB laser 46 is designed for Channel n can only be plugged into the slot in Column n (n=1, . . . , N). The LRCs 20 have no connections on the front panel. All connections to the LRCs 20 are made by back-panel connectors that are mated when the LRC is inserted into its specified slot. These connections include the serial ECL input from the associated IOC 14, the serial ECL output to the associated IOC 14, the optical input from the grating 24, the optical output to the grating 24, power, and diagnostic signals. The diagnostic signals include the aforementioned Port Status Input from the associated IOC 14, the Laser Status Output to the DPC 26, the Laser Control Status Output to the DPC 26, the Received Data Output to the DPC 14, the Pulse input from the DPC 26, and also the CLK signal from the DPC 26.

As is seen in FIG. 4, the IOCs 14 have connections on the front panel, generally shown as the I/O specific media connectors 30, that are specific to the particular transmission medium and protocol supported by each IOC 14, e.g. ESCON, FDDI, HIPPI, etc. Other connections are made via backplane connectors that are mated when the IOC 14 is inserted into a slot. These connections include the serial ECL input from the associated LRC 20, the serial ECL output to the associated LRC 20, power, and the Port Status Output to the associated LRC 20 and the DPC 26.

The ability to select a particular IOC 14 for different serial or parallel data protocols and to add, remove, and to change the IOCs at will is an important feature of the invention. The process of adding a new channel, or converting an existing channel to use a new data protocol, involves merely plugging in the same type of IOCs 14a and 14b into the same numbered slots in the two WDMs 12a and 12b at both ends of the fiber link 28, and providing the appropriate data connections to the connectors 30 at the front of the installed IOCs 14. No configuration, wiring, switch settings or other complex operations are needed. The user must only ensure that the two IOCs 14a and 14b are the same type (FDDI, HIPPI, etc.), and that the associated LRCs 20a and 20b are installed and operate at the same wavelengths.

In order to allow for reconfiguration or replacement of faulty modules, both the IOCs 14 and the LRCs 20 are designed to allow hot-pluggability. That is, an IOC 14 and/or a LRC 20 can be plugged or unplugged from the backplane connector of the WDM 12 without having to first power the WDM 12 off, and without disturbing the operation of other channels. This is achieved by providing electrical connectors that make and break the backplane connections in a predetermined order, and through the use of slow turn-on local power regulators on each of the IOCs and LRCs. It is also within the scope of this invention to provide logic that causes the IOC 14 or LRC 20 to activate only when a last pin of the backplane connector connects.

The diagnostic connector 72 is provided to allow for remote network device management and problem isolation. In the presently preferred embodiment of this invention the connector 72 conveys RS-232C compatible signals to an external processor and provides at least the following indications: per channel indication of Operational/Not Operational, and per channel indication of Laser Safety shutdown.

Figure 6:
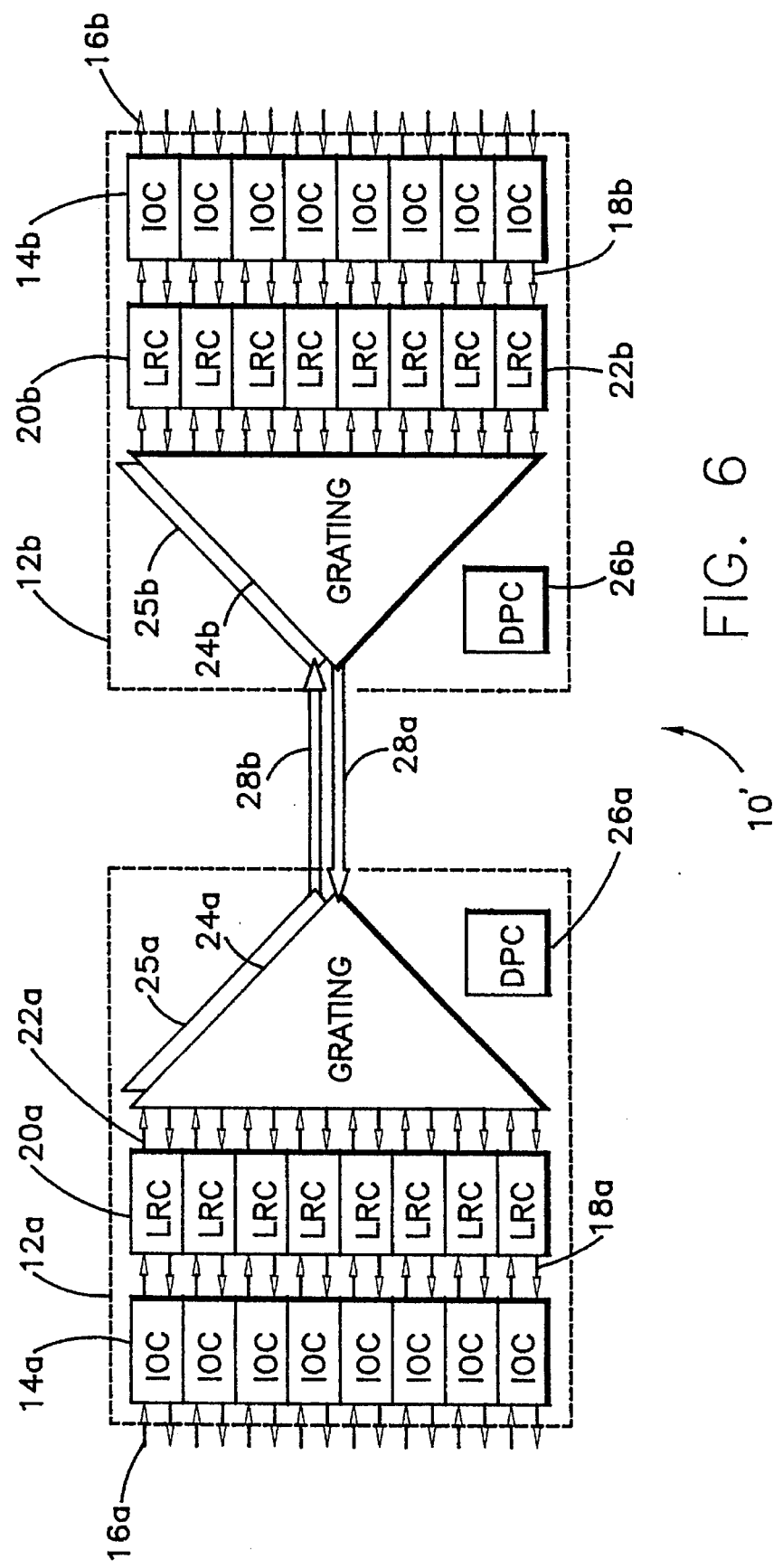
FIG. 6 is a block diagram of a second embodiment of an optical WDM that is constructed in accordance with this invention.

In a further embodiment (10') of the invention that is depicted in FIG. 6 a second fiber 28b, and a second grating 25, are employed. In this further embodiment of the invention one grating/fiber combination is employed for transmitting, while the second grating/fiber combination are employed for receiving. This embodiment enables wavelength re-use in each direction, and furthermore enables optical amplifiers (typically uni-directional) to be used as required.

Figure 5:
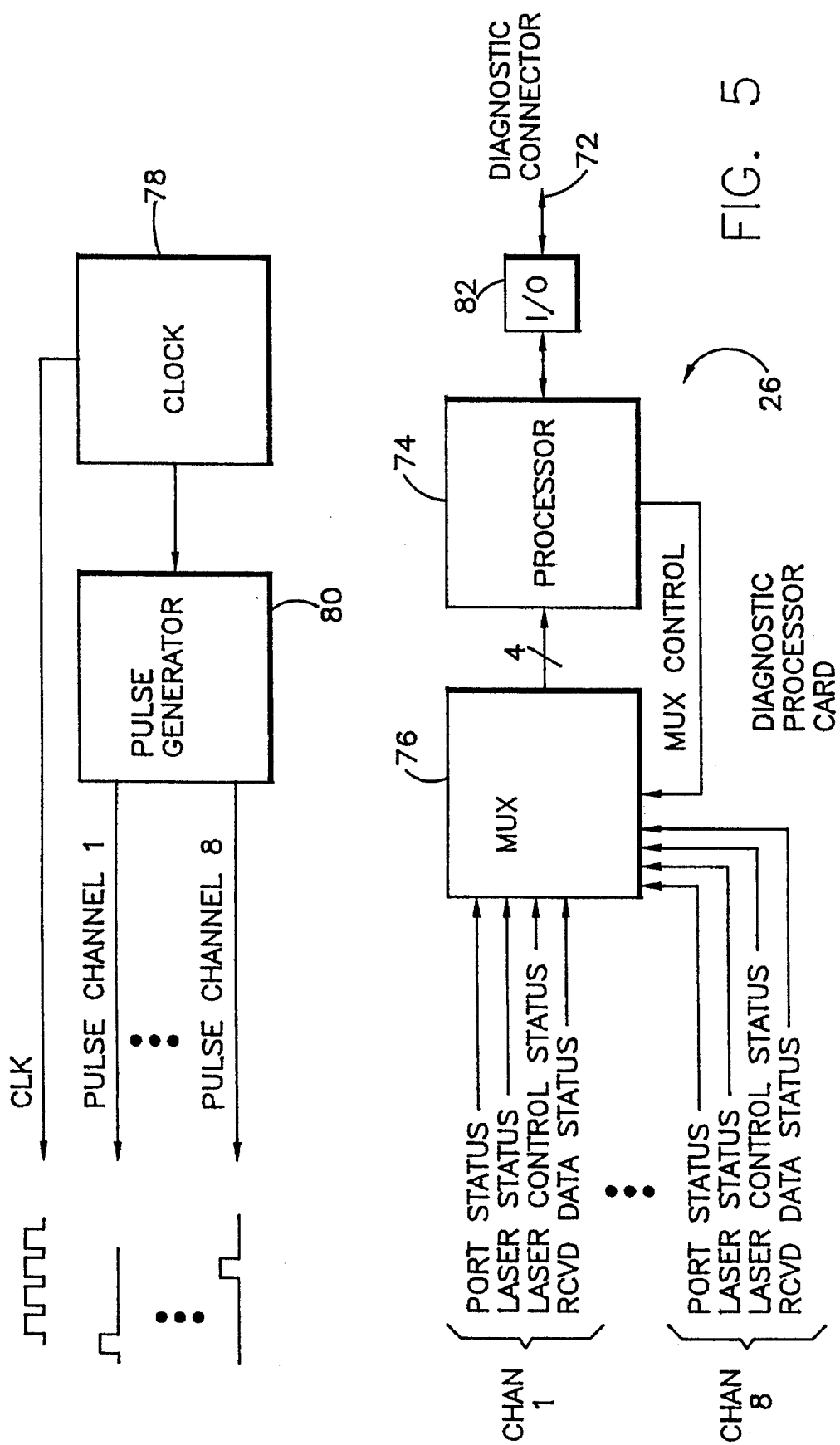
FIG. 5 is a block diagram of a Diagnostic Processor card (DPC) that is a feature of the WDM of FIG. 1.

FIG. 5 illustrates the DPC 26. The DPC 26 includes a processor 74 that operates under the control of a stored program to receive the various status signals from a status multiplexer 76. The processor 74 periodically changes the state of a plurality of MUX CONTROL signal lines to select a group of four status signal lines from one of the eight channels. The processor 74 may interpret the status signals locally, or may simply transmit the status signal indications to the external network processor for evaluation.

For example, one possible failure mode is related to the drift of the transmitter DFB laser 46 wavelength out of the associated passband of the grating 24. This is signified by the presence of laser light emission, as indicated by the Laser Status Output status line being true, and the absence of the detector 56 output on that channel, as indicated by the Received Data output status line being false, and the presence of the detector 56 output on all other installed other channels, as indicated their Received Data Output status lines being true.

A pulse generator 80 periodically outputs a pulse on one of the Pulse Channel n lines to an associated one of the LRCs 20. The pulse is obtained from a CLOCK circuit 78, and is applied to each LRC 20, by example, once every 10 seconds. The application of the pulse causes the LRC 20 to briefly turn on the DFB laser 46, if not already on. This enables the operation of the DFB laser 46 to be verified by the WDM at the other end of the fiber 28, which transmits an optical pulse in reply. The pulse is received and the Received Data Status signal is asserted by the receiving circuitry for that channel.

The pulses are applied to the LRCs in a sequential and non-overlapping manner so as not to turn on more than one DFB laser at a time. This is a safety consideration, in that if the link fiber 28 is broken the laser intensity that is transmitted from the broken end is minimized. Also, the LRCs 20 are designed such that the associated DFB laser 46 cannot be energized until at least one pulse is received from the DPC 26. As such, if the DPC 26 is inoperable or not installed none of the DFB lasers 46 can be operated.

Figure 3B:
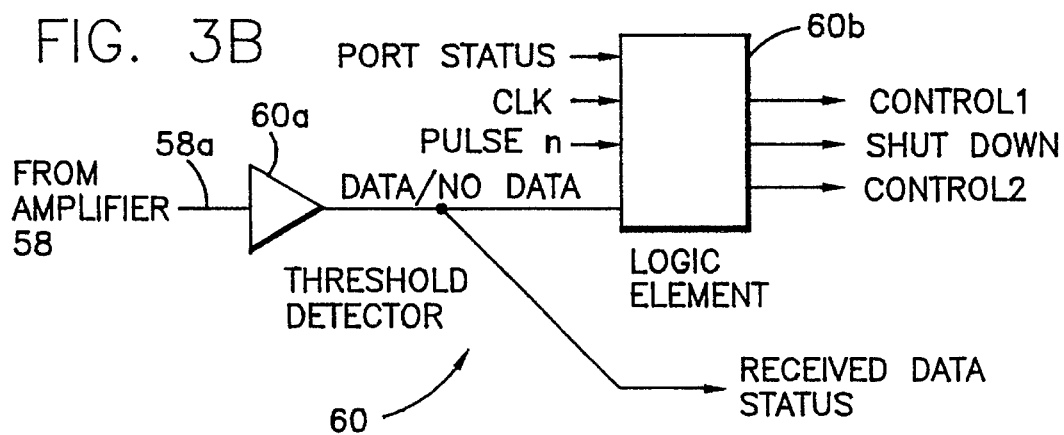

The CLOCK circuit also outputs a 10 MHz signal that drives the CLK signal line to every LRC 20. Referring to FIG. 3b, the CLK signal is applied to an input of a logic element 60b. Logic element 60b may be implemented as a Programmable Logic Device (PAL). Other inputs to the logic element 60b include the Port Status input from the associated IOC 14, the associated Pulse n signal from the DPC 26, and a Data/No Data signal that is output from a threshold detector 60a. Threshold detector 60a receives an input from the detector amplifier 58 via line 58a. The output of the threshold detector 60a indicates whether an optical signal indicative of a valid one or zero logic state is being received from the attached WDM. The logic element 60b is responsive to these inputs to generate two control signal outputs (Control1 and Control2). The ECL MUX 50 has a select (SEL) input coupled to the Control1 signal generated by the associated logic element 60b.

The Control1 signal is provided such that when Port Status is true, and at least one Pulse n signal has been received from the DPC 26, the first MUX 50 input signal (from the connector 52) is coupled through the MUX 50 to drive the DFB laser 46, via the laser controller 48. Port Status being true indicates that the IOC receiver 34 is receiving a signal that indicates that the associated communications medium is providing an input to the IOC 20 (for example, that light is present if the communications channel is an optical channel).

If the input to the IOC 20 is disconnected or otherwise impaired the Port Status signal goes false, causing the Control1 signal to select the second input to the MUX 50.

The second input to the MUX 50 is the Control2 signal which, for this case, is the 10 MHz CLK signal. As a result, the DFB laser 46 is driven with the 10 MHz signal and not noise, thereby placing the laser in a known transmitting state. This facilitates re-establishing the link connection between the sending and receiving data communications equipment that are communicating through the WDMs 12a and 12b.

If at least one Pulse n signal is not received, regardless of the state of the Port Status signal, the Control1 signal is set to select the second input to the MUX 50. The second input to the MUX 50 is again the Contrl2 signal which, for this case, is set to a predetermined logic state, such as a logic zero state. The forced logic zero state, in conjunction with the Shut Down signal being asserted to the laser controller 48, causes the output of the laser 46 to be at a low level (i.e., a level below the lowest level associated with either a logic zero or a logic one output state).

The DPC 26 also includes an I/O device 82, such as a UART, that provides the circuitry necessary to transmit and receive RS-232C information through the diagnostic connector 72.

Whether the diagnostic information is interpreted locally by the processor 72, or externally in an attached computer that runs a network management application (e.g. a Link Problem Determination Application—LPDA), is a function in part of the desired complexity of the DPC 26.

In order to comply with various domestic and international laser safety regulations, each LRC 20 incorporates the laser safety circuitry 60 which operates to shut down the output of the DFB laser 46 whenever the detector 56 does not detect input light. This condition is also reflected in the state of the Received Data Status signal. Laser shut down prevents eye injury due to laser radiation being emitted from a broken fiber. A similar safety circuit 36 is provided in those IOCs 14 that employ a laser diode as the Tx 32. In this case, an absence of received light, as detected by the Rx 34, causes the Tx 32 laser to be shut down. The absence of received light also results in the Port Status signal being negated, as described previously.

Although the invention has been described in the context of presently preferred embodiments thereof, it should be apparent that a number of modifications to this preferred embodiment may occur to those having skill in the art. For example, more or less than eight channels can be accommodated within a single WDM 12. Also by example, the IOCs 14 could be designed to interface with other types of communications protocols and formats than those specifically listed above. Furthermore, a plurality of WDMs 12 in disjoint wavelength bands can be provided at a site, the outputs of which are further wavelength division multiplexed before being inserted into the fiber link 28. Also, it is within the scope of the invention to provide for two fiber links 28, one a primary link and the other a backup. For this case, a bidirectional optical switch is inserted between the output of the grating 24 and the input of the fiber link 28 for selecting either the primary or the backup fiber. Switching may occur automatically in response to the DPC 26 detecting an absence of received light for all channels (all Received Data Status signals being negated), or may occur manually. Furthermore, it is within the scope of the invention to employ an erbium-doped optical fiber 28 to increase the range of transmission and the maximum bit rate.

Figure 7B:
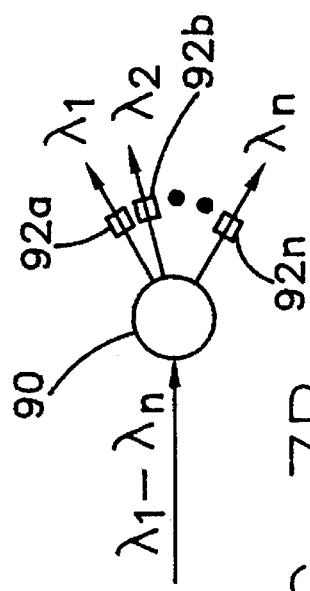
FIGS. 7a-7c each illustrate the use of one or more optical couplers, in conjunction with wavelength selective filters, as an optical multiplexer/demultiplexer.
Figure 7C:
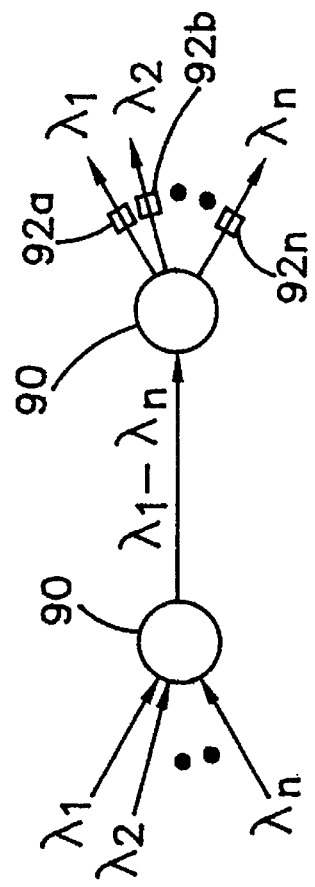
Figure 7A:
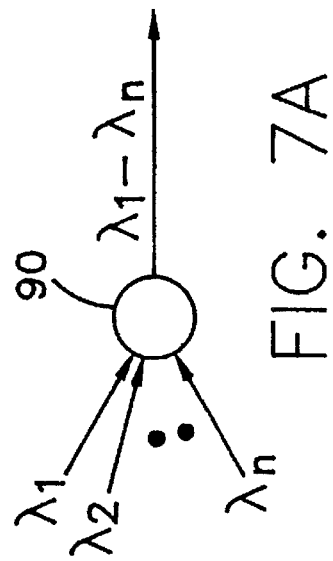

It is also within the scope of the teaching of this invention to employ optical couplers 90, as depicted in FIGS. 7a–7c, in place of the grating 24. The optical coupler 90 can be used in conjunction with a plurality of wavelength selective filters 92a–92n to multiplex and demultiplex a plurality of optical signals, shown as $\lambda_1$ to $\lambda_n$.

By example, FIG. 7a illustrates the use of a star coupler 90 as a multiplexer; FIG. 7b illustrates the use of a star coupler 90 as a demultiplexer; and FIG. 7c illustrates the use of star couplers as both multiplexers and demultiplexers.

It is also pointed out that a single given input to the WDM may actually convey information signals to and from a plurality of individual users, as is typically the case when a Time Division Multiplex (TDM) communications protocol is employed.

Thus, while the invention has been particularly shown and described with respect to preferred embodiments thereof, it will be understood by those skilled in the art that changes in form and details may be made therein without departing from the scope and spirit of the invention.

Having thus described our invention, what we claim as new, and desire to secure by Letters Patent is:

1. Communications apparatus, comprising:

a plurality of input/output (I/O) interface units, each of said I/O interface units including means for coupling to a communications network for receiving a signal from the network and for transmitting a signal to the network, each of said I/O interface units further including an input buffer means having an input for receiving a first electrical signal representing information to be transmitted to the network, each of said I/O interface units further including an output buffer means having an output for providing a second electrical signal representing information received from the network;

a plurality of optical transmitter and receiver units each including an optical transmitter means and an optical receiver means, individual ones of said optical transmitter and receiver units being coupled to one of said I/O interface units for providing said first electrical signal thereto and for receiving said second electrical signal therefrom, said second electrical signal being supplied to said optical transmitter means for modulating an output thereof, said first electrical signal being output from said optical receiver means, each of said optical transmitter and receiver units having an optical transmitter means that generates an optical signal that differs in wavelength from others of said optical transmitter means; and optical multiplexing and demultiplexing means having a plurality of inputs, individual ones of said inputs being coupled to an output of an optical transmitter means of one of said optical transmitter and receiver units, said optical multiplexing and demultiplexing means further having a plurality of outputs, individual ones of said outputs being coupled to an input of an optical receiver means of one of said optical transmitter and receiver units, said optical multiplexing and demultiplexing means having a port for bidirectionally coupling to an optical fiber and operating to wavelength division multiplex said inputs from said plurality of optical transmitter means before application to the optical fiber and to wavelength division demultiplex optical signals received from the optical fiber and to separately provide demultiplexed optical signals to said plurality of outputs; wherein at least two of said I/O interface units are coupled to networks that operate with different network protocols.

2. Communications apparatus as set forth in claim 1 wherein one of said I/O interface units is coupled to a network that conveys information signals over an electrical conductor, and wherein at least one other one of said I/O interface units is coupled to a network that conveys information signals over an optical conductor.

3. Communications apparatus as set forth in claim 1 wherein each of said plurality of I/O interface units includes means for generating a first status signal indicating an operational status of the network that is coupled to said receiving means, and wherein each of said plurality of optical transmitter and receiver units includes means for generating at least one second status signal indicating an operational status of said optical transmitter means and a third status signal indicating an operational status of said optical receiver means.

4. Communications apparatus as set forth in claim 3 and further including diagnostic processor means having inputs coupled to said first, second, and third status signals from each of said plurality of I/O interface units and each of said plurality of optical transmitter and receiver units, said diagnostic processor means further having an output for transmitting information indicating a state of all of said first, second, and third status signals.

5. Communications apparatus as set forth in claim 3 wherein each of said plurality of optical transmitter and receiver units includes a signal multiplexing means that is interposed between said optical transmitter means and the second electrical signal that is received from an associated one of said I/O interface units, said signal multiplexing means including a first input coupled to said second electrical signal, a second input coupled to a signal line that conveys a frequency signal, and a selection input that is coupled to said first status signal that is generated by said associated one of said I/O interface units, said signal multiplexing means being responsive to a first state of said first status signal for coupling said second electrical signal to an input of said optical transmitter means and responsive to a second state of said first status signal for coupling said frequency signal to said input of said optical transmitter means.

6. Communications apparatus as set forth in claim 1 and further comprising timing means that repetitively generates a plurality of enabling signals, individual ones of said enabling signals being coupled to one of said optical transmitter means, said enabling signal for each of said optical transmitter means being generated so as not to overlap an enabling signal that is generated for another one of said optical transmitter means.

7. Communications apparatus as set forth in claim 1 wherein said optical multiplexing and demultiplexing means is comprised of a grating means.

8. Communications apparatus as set forth in claim 1 wherein said optical multiplexing and demultiplexing means is comprised of an optical coupler and a plurality of wavelength selective filter means.

9. Communications apparatus, comprising:

a plurality of input/output (I/O) interface units, each of said I/O interface units including means for coupling to a communications network for receiving a signal from the network and for transmitting a signal to the network, each of said I/O interface units further including an input buffer means having an input for receiving a first electrical signal representing information to be transmitted to the network, each of said I/O interface units further including an output buffer means having an output for providing a second electrical signal representing information received from the network;

a plurality of optical transmitter and receiver units each including an optical transmitter means and an optical receiver means, individual ones of said optical transmitter and receiver units being coupled to one of said I/O interface units for providing said first electrical signal thereto and for receiving said second electrical signal therefrom, said second electrical signal being supplied to said optical transmitter means for modulating an output thereof, said first electrical signal being output from said optical receiver means, each of said optical transmitter and receiver units having an optical transmitter means that generates an optical signal that differs in wavelength from others of said optical transmitter means; and optical multiplexing and demultiplexing means having a plurality of inputs, individual ones of said inputs being coupled to an output of an optical transmitter means of one of said optical transmitter and receiver units, said optical multiplexing and demultiplexing means further having a plurality of outputs, individual ones of said outputs being coupled to an input of an optical receiver means of one of said optical transmitter and receiver units, said optical multiplexing and demultiplexing means having a first port for bidirectionally coupling to a first optical fiber and operating to wavelength division multiplex said inputs from said plurality of optical transmitter means before application to the first optical fiber, said optical multiplexing and demultiplexing means having a second port for bidirectionally coupling to a second optical fiber and operating to wavelength division demultiplex optical signals received from the second optical fiber and to separately provide demultiplexed optical signals to said plurality of outputs; wherein at least two of said I/O interface units are coupled to networks that operate with different network protocols.

10. Communications apparatus as set forth in claim 9 wherein one of said I/O interface units is coupled to a network that conveys information signals over an electrical conductor, and wherein at least one other one of said I/O interface units is coupled to a network that conveys information signals over an optical conductor.

11. Communications apparatus as set forth in claim 9 wherein said first port is coupled to a first grating means, and wherein said second port is coupled to a second grating means.

12. Communications apparatus as set forth in claim 9 wherein said first port is coupled to a first optical coupler and plurality of wavelength selective filter means, and wherein said second port is coupled to a second optical coupler and plurality of wavelength selective filter means.

* * * * *